United States Patent

Nyberg

[11] Patent Number: 6,082,399
[45] Date of Patent: Jul. 4, 2000

[54] QUICK COUPLING FOR HOSES OR PIPES FOR PRESSURE MEDIA

[75] Inventor: Kent Nyberg, Skovde, Sweden

[73] Assignee: Bo Erik NYBERG, Oberageri, Switzerland

[21] Appl. No.: 09/155,645

[22] PCT Filed: Mar. 21, 1997

[86] PCT No.: PCT/SE97/00490

§ 371 Date: Nov. 23, 1998

§ 102(e) Date: Nov. 23, 1998

[87] PCT Pub. No.: WO97/37165

PCT Pub. Date: Oct. 9, 1997

[30] Foreign Application Priority Data

Apr. 3, 1996 [SE] Sweden ................................ 9601295

[51] Int. Cl.[7] .................................................. F16L 37/28
[52] U.S. Cl. .................. 137/614.03; 137/614.04
[58] Field of Search ............... 137/614.04, 614.03, 137/614

[56] References Cited

U.S. PATENT DOCUMENTS

| | | | |
|---|---|---|---|
| 4,564,042 | 1/1986 | Ekman | 137/614.03 |
| 5,123,448 | 6/1992 | Kjellberg et al. | 137/614.03 |
| 5,179,976 | 1/1993 | Boland et al. | 137/614.04 |
| 5,337,782 | 8/1994 | Wilcox | 137/614.03 |
| 5,482,083 | 1/1996 | Jenski | 137/614.03 |
| 5,592,970 | 1/1997 | Stucchi et al. | 137/614.03 |

FOREIGN PATENT DOCUMENTS 89001887 10/1993 Switzerland .

*Primary Examiner*—Denise L. Ferensic
*Assistant Examiner*—Joanne Y. Kim

[57] ABSTRACT

The invention relates to a quick coupling for hoses or pipes for pressure media, especially for hydraulic media under high pressure. The coupling comprises a female part (1) and a nipple (2), said female part (1) having a displaceable valve element (4), which, in the decoupled state lies in sealing contact against the female part (1) by means of a sealing ring (5) and has an extension (7) with an enlarged end piece (8). The nipple has a displaceable valve element, which in the decoupled state, seals against the nipple (2) by means of a sealing ring (19). According to the invention, the valve element (4) of the female part (1) has, about its extension (7), an axially displacable tube (9) which is urged by its spring (11) towards a position in abutment against the end piece (8). The tube (9) has essentially the same outer diameter as the valve elements (4, 18). The tube (9) is disposed, when the female part (1) and the nipple (2) are coupled together, to be inserted into the sealing rings (5, 19) to protect them.

3 Claims, 1 Drawing Sheet

QUICK COUPLING FOR HOSES OR PIPES FOR PRESSURE MEDIA

This application is the national phase under 35 U.S.C. §371 of prior PCT International Application No. PCT/SE97/00490 which has an International filing date of Mar. 21, 1997 which designated the United States of America, the entire contents of which are hereby incorporated by reference.

The invention relates to a quick coupling for hoses or pipes for pressure media especially for hydraulic media under high pressure.

Quick couplings of this type are previously known in a number of different constructions. These couplings are intended for use in hydraulic systems for example and they are so called no-spillage couplings, i.e. both parts of the coupling are tight even in decoupled state and there is no leakage of pressure medium to the surroundings when the coupling is decoupled.

If a coupling of this type is used in a hydraulic system under high pressure, there can be damage to the coupling when the parts are coupled together under pressure. This is due to the fact that if one coupling part is under pressure and the other is pressureless, there will be, when coupled together, a heavy pressure impact when the pressure medium flows into the pressureless coupling part. This will involve a great risk that the pressure medium will cause damage to sealing rings or the like or even tear out the sealing rings. Thus, they will not be able to perform their function when the coupling is decoupled and torn off parts of sealing rings or entire sealing rings may be carried further into the hydraulic system and cause damage to other locations therein. When there is a sudden drop in pressure on one side of a coupled coupling, there is also a flow suroe which can give rise to corresponding damage.

The invention is intended to achieve a quick coupling of the type described by way of introduction which removes the risks described above and provides secure decoupling and coupling together even under high pressure with no risk that the sealing rings or other sealings means will be damaged or torn out by the pressure medium. This is achieved according to the invention by providing the quick coupling with those features which are disclosed in the characterizing clause of claim 1.

Advantageous embodiments of the invention are disclosed in the subclaims.

The invention will be described in more detail below with reference to the accompanying drawing in which.

Figure 1:
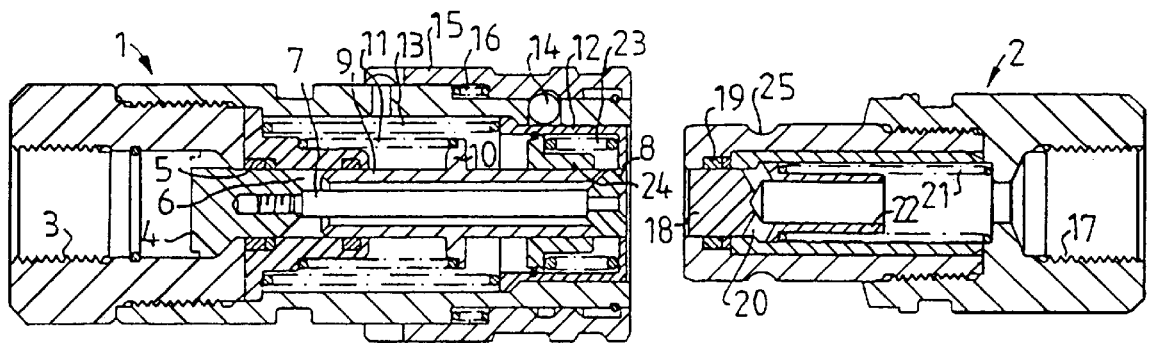
FIG. 1 shows a longitudinal section through a quick coupling according to one embodiment of the invention in its decoupled state.
Figure 4:
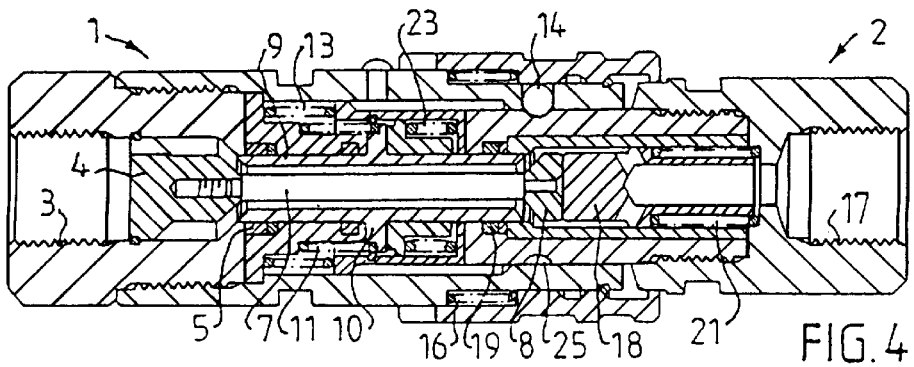
FIG. 4 shows a longitudinal section through the quick coupling according to FIG. 1 in its coupled state.

The quick coupling shown in the drawing according to the invention consists of two main parts, namely a female part 1 and a nipple 2. The female part 1 is essentially cylindrical and is provided with connector means for connecting a hose, a pipe or the like (not shown). The female part 1 has a valve element which is axially displaceable between a closed position, which is shown in FIG. 1, and an open position, which is shown in FIG. 4. In the closed position shown in FIG. 1, the valve element 4 seals against the female part 1 with the aid of a sealing ring 5, which is disposed in a groove in the wall of a channel 6 in the female part 1.

The valve element 4 is provided with an extension 7 which extends towards the end of the female part 1 facing away from the connection means 3. At its free end, the extension 7 is provided with an enlarged end piece 8, the outer diameter of which is equal to the outer diameter of the portion of the valve element cooperating with the sealing ring 5. The diameter of the extension 7 is appreciably smaller. A tube 9 is disposed around the extension 7, and this tube has the same outer diameter as the end piece 8 and a greater inner diameter than the extension 7 so as to form an annular channel between the extension 7 and the tube 9. The tube 9 is provided with a radial flange 10, which is an abutment surface for one end of a spring 11, the other end of which abuts against a contact surface of the female part 1. The spring 11 presses the tube 9 against the end piece 8, which in turn, via the extension 7, urges the valve element 4 to the closed position shown in FIG. 1. The end piece 8 is located with its end surface essentially coplanar with the end surface of the female part 1.

An intermediate sleeve 12 is arranged radially outside the end piece 8 to provide, in the closed position shown in FIG. 1, i.e. with the parts of the quick coupling decoupled, and essentially planar end surface of the female part 1. The intermediate sleeve 12 is held resiliently in this position by means of a spring 13 which acts between the intermediate sleeve 13 and an abutment in the female part 1.

The intermediate sleeve 12 keeps in this position a number of balls 14 in a ball locking means of known type in their inactive position. The outer portions of the balls 14 extend in this case into a peripheral groove in an operating sleeve 15 for the ball locking means. The operating sleeve 15 is biased by the force of its spring 16 which acts between the operating sleeve 15 and the shoulder in the female part 1.

The nipple 2 is provided with connecting means 17 for a pipe, hose or the like (not shown). The nipple 2 is also provided with a valve element 18. which in the closed position shown in FIG. 1, provides a seal with the aid of a sealing ring 19 against the nipple 2. The sealing ring 19 is located in a groove in the internal wall of a channel 20 in the nipple 2. The sealing element 18 can be made with the same external diameter as the end piece 8, and the sealing element 4 in the female part 1 is urged towards the position shown in FIG. 1 by a spring 21, which acts between the valve element and an abutment in the nipple 2.

As can be seen from the above description, both the female part 1 and the nipple 2 in their decoupled position have essentially planar and completely covered end surfaces, which means that both of these parts are easy to keep clean or to be cleaned before coupling together. Since the valve elements in both the female part and the nipple 2 are also in their closed position, there is no risk of leakage or of penetration of foreign objects into the components of the coupling.

Figure 2:
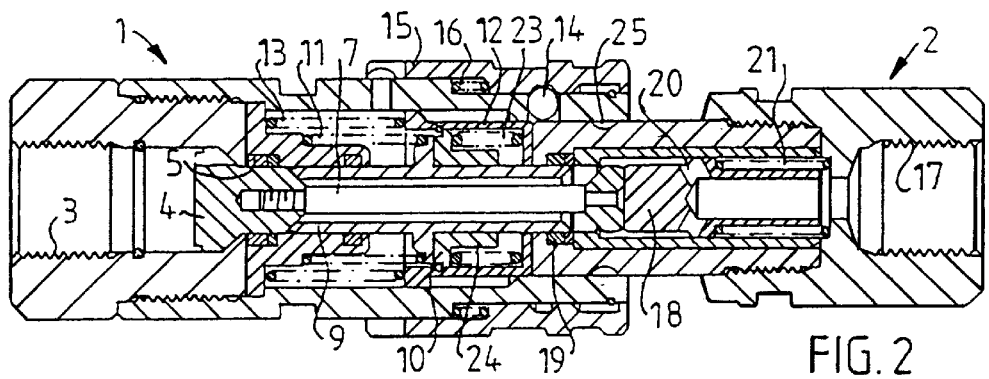
FIGS. 2 and 3 show longitudinal sections through the quick coupling according to FIG. 1 in two different states during a coupling sequence.
Figure 3:
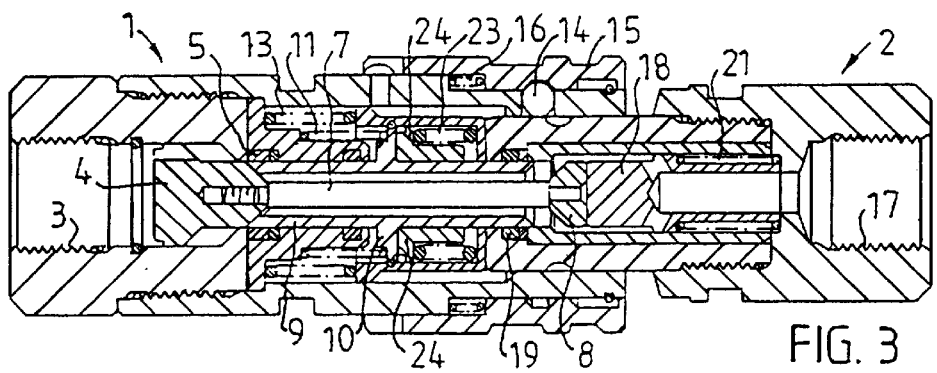

The coupling together of the female part 1 and the nipple 2 is shown in sequence in FIGS. 2–4. In FIG. 2, the nipple 2 has been moved a certain distance into the female part 1 and has displaced the intermediate sleeve 12 against the force of its spring 13. At the same time, the end piece 8 on the extension 7 of the valve element 4 has displaced the valve element 18 in the nipple 2, so that the valve element 18 is no longer in contact with the sealing ring 19. The tube 9 abuts against the valve element 4, and, as can be seen in FIG. 2, the sealing ring 19 in the nipple 2 will be slipped over the end of the tube 9 before the end piece 8 is pushed into the channel 20 in the nipple 2 to permit flow therethrough. The valve element 4 in the female part 1 is still in its closed position.

Continued insertion of the nipple 2 into the female part 1 will displace the valve element 18 with an extension 22 into contact with an abutment in the nipple 2 so that it cannot be displaced any further into the nipple 2. Thereafter, the valve element 18 will displace, via the end piece 8 and the extension 7, displace the valve element 4 in the female part 1 away from contact with the sealing ring 5. This is shown in FIG. 3 where the valve element 4 has just left the sealing ring 5. At the same time the tube 9 will be moved into the sealing ring 5 by the force of a spring 23 acting between the intermediate sleeve 12 and a sleeve 24 slidably disposed on the outside of the tube 9. The sleeve 24 acts against the flange 10 of the tube 9. The spring 23 is heavier than the spring 1 which acts on the tube 9 in the opposite direction. It is important that the intermediate sleeve 12 and the sleeve 24 can move relative to each other against the spring 23. The nipple 2 can thereby continue into the female part 1 when the tube 9 has reached its end position, as shown in FIG. 4. Upon continued movement, the valve element 4 will be moved away from the end of the tube 9 so as to open the flow path.

FIG. 4 shows the quick couplind according to the invention in its entirely coupled state. The nipple 2 has then moved further into the female part 1, so that the balls 14 in the ball lock means have been moved into a circumferential groove 25 in the outer surface of the nipple 2. The balls 14 have been moved into the groove 25 under the influence of an oblique surface in the groove in the operating sleeve 15, which, by the action of the spring 16, presses the walls 14 into the groove 25 and is thereafter moved axially so that its end is moved somewhat up the nipple 2. The operating sleeve 15 lies thereafter with a planar surface outside the balls 14 so that they cannot move outwards. The nipple 2 is thereby locked in the female part 1 in a known manner.

In the completely coupled position shown in FIG. 4, the valve element 4 has been moved to its entirely open position so the pressure means can flow through the female part 1. At the same time the valve element 18 in the nipple 2 is in its entirely open position, so that pressure medium can flow through the nipple 2 as well. The tube 9 has been moved with its end into the sealing rings 5 and 19 respectively in the female part 1 and the nipple 2 respectively so that these sealing rings are protected and not subjected to the effect of the pressure medium. This is especially important in that stage when the valve element 4 opens for pressure medium, since pressure shocks easily occur in the this stage, which could damage the sealing rings 5 and 19 and possibly tear them out of their grooves. This could lead to damage to other parts of the hydraulic system, and must of course be avoided.

The invention is not limited to the example described above. Rather, changes and modifications can be made within the scope of the following claims. For example the valve elements 4 and 18 can be made with different diameters, but the tube 9 used therewith must have end portions with diametres corresponding to the sealing rings 5 and 19 respectively

I claim:

1. Quick coupling for hoses or pipes for pressure media, especially for hydraulic media under high pressure, said coupling comprising:

a female part and a nipple, said female part being provided with a valve element which is axially displaceable and is spring biased in the decoupled state of the quick coupling to sealing contact with the female part by means of a sealing ring placed in a groove in the female part and is provided with an extension with an enlarged end piece, which, in the decoupled position, is located with its end surface at the end surface of the female part, an intermediate sleeve being arranged around said end piece and being located, in the decoupled state, with its end surface at the end surface of the female part, said nipple being provided with a valve element which is axially displaceable and is spring biased, in the decoupled state, to sealing contact against the nipple by means of a sealing ring placed in a groove in the nipple, as well as being located with its end surface at the end surface of the nipple, wherein the valve element of the female part has, about its extension, an axially displaceable tube, which is displaceable between a first position in which its one end abuts against the end piece, and a second position, in which its other end abuts against the valve element proper, the tube being urged by its spring towards the first position, the tube having essentially the same outer diameter as the valve element of the female part and the valve element of the nipple, said tube being disposed, upon coupling together of the female part and the nipple, to be inserted into the sealing rings to protect them.

2. Quick coupling according to claim 1, wherein the tube has an essentially radially outwardly directed flange, against one side of which the spring acts and against the other side of which the nipple acts for displacing the tube to its second position during coupling.

3. Quick coupling according to claim 2, wherein the nipple acts against the flange of the tube via a spring, which is stronger than the spring acting against the opposite side of the flange.

* * * * *